(12) United States Patent
Nomura et al.

(10) Patent No.: US 10,544,289 B2
(45) Date of Patent: Jan. 28, 2020

(54) PROCESS FOR PRODUCING WET RUBBER MASTERBATCH

(71) Applicant: TOYO TIRE & RUBBER CO., LTD., Osaka-shi, Osaka (JP)

(72) Inventors: Kenji Nomura, Osaka (JP); Makoto Tanaka, Osaka (JP)

(73) Assignee: Toyo Tire Corporation, Itami-shi (JP)

( * ) Notice: Subject to any disclaimer, the term of this patent is extended or adjusted under 35 U.S.C. 154(b) by 461 days.

(21) Appl. No.: 15/313,335

(22) PCT Filed: Jan. 14, 2015

(86) PCT No.: PCT/JP2015/050802
§ 371 (c)(1),
(2) Date: Nov. 22, 2016

(87) PCT Pub. No.: WO2016/002235
PCT Pub. Date: Jan. 7, 2016

(65) Prior Publication Data
US 2017/0183481 A1    Jun. 29, 2017

(30) Foreign Application Priority Data

Jul. 1, 2014   (JP) ................................. 2014-135540

(51) Int. Cl.
| | |
|---|---|
| *C08K 3/04* | (2006.01) |
| *C08K 5/09* | (2006.01) |
| *C08L 7/02* | (2006.01) |
| *B60C 1/00* | (2006.01) |
| *C08K 3/06* | (2006.01) |
| *B60C 15/06* | (2006.01) |
| *C08J 3/22* | (2006.01) |
| *C08J 3/215* | (2006.01) |
| *C08K 5/00* | (2006.01) |
| *C08K 3/00* | (2018.01) |

(52) U.S. Cl.
CPC .................... *C08L 7/02* (2013.01); *B60C 1/00* (2013.01); *B60C 15/06* (2013.01); *C08J 3/215* (2013.01); *C08J 3/22* (2013.01); *C08K 3/00* (2013.01); *C08K 3/04* (2013.01); *C08K 3/06* (2013.01); *C08K 5/00* (2013.01); *C08K 5/09* (2013.01); *C08J 2307/02* (2013.01); *C08L 2310/00* (2013.01)

(58) Field of Classification Search
CPC .. B60C 1/10; B60C 15/06; C08J 3/215; C08J 2307/02; C08J 2310/00; C08K 3/04; C08K 3/06; C08K 5/09; C08L 7/02
See application file for complete search history.

(56) References Cited

U.S. PATENT DOCUMENTS

| | | | |
|---|---|---|---|
| 5,883,179 A | 3/1999 | Kawazoe et al. | |
| 8,053,496 B1 | 11/2011 | Minouchi et al. | |
| 2015/0133592 A1* | 5/2015 | Miyasaka | B60C 1/00 524/495 |
| 2015/0247011 A1 | 9/2015 | Nomura et al. | |
| 2016/0289398 A1* | 10/2016 | Tanaka | B60C 1/0016 |

FOREIGN PATENT DOCUMENTS

| | | |
|---|---|---|
| DE | 112013005326 T5 | 9/2015 |
| EP | 2476720 A1 | 7/2012 |
| JP | 9-118781 A | 5/1997 |
| JP | 2006-213866 A | 8/2006 |
| JP | 2006-328135 A | 12/2006 |
| JP | 2007-237456 A | 9/2007 |
| JP | 2010-284799 A | 12/2010 |
| JP | 2012-144680 A | 8/2012 |
| JP | 2012214566 A * | 11/2012 |
| JP | 2014-91810 A | 5/2014 |
| WO | 2009/116543 A1 | 9/2009 |
| WO | WO-2014057705 A1 * | 4/2014 |
| WO | 2014/073234 A1 | 5/2014 |
| WO | WO-2015068416 A1 * | 5/2015 |

OTHER PUBLICATIONS

Office Action dated Apr. 10, 2018, issued in counterpart Chinese Application No. 201580027973.7, with English translation. (12 pages).

(Continued)

*Primary Examiner* — Irina S Zemel
*Assistant Examiner* — Jeffrey S Lenihan
(74) *Attorney, Agent, or Firm* — Westerman, Hattori, Daniels & Adrian, LLP

(57) ABSTRACT

A process for producing a wet rubber masterbatch comprises a step (I) of dispersing a filler into a dispersing solvent to produce a filler-containing slurry solution, and a step (II) of adding a rubber latex solution to the filler-containing slurry solution to yield a filler-containing rubber latex solution, and stirring the yielded filler-containing rubber latex solution while heating the filler-containing rubber latex solution, thereby solidifying the filler-containing rubber latex solution, and a step (III) of stirring the resultant while adding an acid thereto, thereby solidifying the filler-containing rubber latex solution. In the step (II), the circumferential speed of a stirring impeller which a mixing tank used at the time of the stirring has is less than 10 m/s, and a calorie of 25 to 250 J both inclusive per unit period and unit mass is given to the filler-containing rubber latex solution by the heating.

9 Claims, No Drawings

(56) References Cited

OTHER PUBLICATIONS

Office Action dated May 9, 2018, issued in counterpart German Application No. 112015003098.0, with English translation. (7 pages).
Notification of Transmittal of Translation of the International Preliminary Report on Patentability (Form PCT/IB/338) issued in counterpart International Application No. PCT/JP2015/050802 dated Jan. 12, 2017, with Forms PCT/IB/373 and PCT/ISA/237. (7 pages).
International Search Report dated Apr. 7, 2015, issued in counterpart of International Application No. PCT/JP2015/050802 (2 pages).
Office Action dated Mar. 13, 2018, issued in counterpart Japanese Application No. 2014-135540, with English machine translation. (5 pages).

* cited by examiner

PROCESS FOR PRODUCING WET RUBBER MASTERBATCH

TECHNICAL FIELD

The present invention relates to a wet rubber masterbatch obtainable using at least a filler, a dispersing solvent and a rubber latex solution as raw materials, and a process for producing the masterbatch; a rubber composition containing the wet rubber masterbatch; and a pneumatic tire obtained using the rubber composition.

BACKGROUND ART

Hitherto, in the rubber industry, it has been known that when a rubber composition containing a filler such carbon black is produced, a wet rubber masterbatch is used to improve the workability of the composition, or the dispersibility of the filler. This manner is a manner of mixing the filler and a dispersing solvent beforehand with each other at a predetermined ratio; mixing, in a liquid phase, the resultant filler-containing slurry solution, in which the filler is dispersed in the dispersing solvent by mechanical force, with a rubber latex solution; and subsequently adding a solidifier such as an acid to the mixture to solidify the mixture and then collecting and drying the resultant solidified product. In the case of using the wet rubber masterbatch, a rubber composition is obtained which is excellent in filler-dispersibility therein and in rubber physical properties such as workability and reinforceability than in the case of using a dry rubber masterbatch. The use of such a rubber composition as a raw material makes it possible to produce, for example, a pneumatic tire decreased in rolling resistance and excellent in fatigue resistance, or such a rubber product.

In the market, however, about the filler-dispersibility-improving effect obtained by using such a wet rubber masterbatch technique, performances therefor have been desired in the actual circumstances to be further increased up. When a wet rubber masterbatch is produced, in each step therefor many contrivances have been made for filler-dispersibility improvement.

Patent Document 1 listed below describes a technique of using a solidifier to solidify a mixture of 100 parts by weight (as a solid content) of a latex of a diene-based rubber component, and 10 to 250 parts by weight (as a solid content) of a slurry of a rubber-reinforcing carbon black having a surface to which amorphous silica is caused to adhere.

Patent Document 2 listed below describes the following technique in a process for producing a natural rubber masterbatch which has the step of mixing a natural rubber latex and a carbon black slurry with each other in a liquid phase, and the step of solidifying the mixture: when a solidifier such as an acid is used to solidify the rubber latex, the shearing force given thereto is adjusted into the range of 3 to 100 Pa.

Patent Document 3 listed below also describes the following technique in the step of mixing a natural rubber latex and a carbon black slurry with each other in a liquid phase, and then solidifying the mixture: the pH of the liquid phase is adjusted into the range of 8 to 10, and the temperature of the liquid phase and the stirring shearing force given thereto are set into the range of 20 to 80° C. and that of 10 to 1000 kPa, respectively, without adding any solidifier thereto, thereby restraining the natural rubber in the masterbatch from being lowered in average molecular weight.

Furthermore, Patent Document 4 listed below describes the following technique in a process for producing a wet masterbatch which includes mixing a slurry solution containing a filler continuously with a rubber solution, and solidifying the mixture: while the solidification is performed, the slurry solution and the rubber solution are stirred through stirring-impellers located in a tank for the solidification, thereby producing a solidified product, and this solidified product is crushed through crushing-impellers located in the solidification tank.

PRIOR ART DOCUMENTS

Patent Documents

Patent Document 1: JP-A-H09-118781
Patent Document 2: JP-A-2006-213866
Patent Document 3: JP-A-2006-328135
Patent Document 4: JP-A-2007-237456

SUMMARY OF THE INVENTION

Problems to be Solved by the Invention

However, the inventors have made eager investigations to find out that the above-mentioned precedent techniques each have a problem. Specifically, the techniques described in Patent Documents 1 to 4 do not have two solidifying steps when a wet rubber masterbatch is produced. When the solidified step is changed to two steps, investigations are much less made about a point of optimizing the balance between thermal energy and mechanical energy in the first solidifying step. It has been therefore made evident that there remains a room, particularly, for improving the filler further in dispersibility.

In light of the above-mentioned actual circumstances, the present invention has been made. An object thereof is to provide a wet rubber masterbatch which contains an evenly dispersed filler and is a raw material of a vulcanized rubber excellent in exothermic property and fatigue resistance; a process for producing the masterbatch; a rubber composition; and a pneumatic tire.

Means for Solving the Problems

In order to solve the problems, the inventors have paid attention, particularly, to a solidifying step when a wet rubber masterbatch is produced so as to make eager investigations. As a result, the inventors have found out that: the solidifying step is divided into two steps; in the first solidifying step, thermal energy and mechanical energy are optimized and given to a filler-containing rubber latex solution obtained by adding a rubber latex solution to a filler-containing slurry solution, thereby attaining this solidifying step; and in the second solidifying step, an acid is added to the filler-containing rubber latex solution, thereby attaining this solidifying step, whereby the dispersibility of the carbon black can be remarkably improved in the resultant wet rubber masterbatch. On the basis of this finding, the present invention has been achieved, and is as follows:

The present invention relates to a process for producing a wet rubber masterbatch obtainable using at least a filler, a dispersing solvent and a rubber latex solution as raw materials, the process comprising a step (I) of dispersing the filler into the dispersing solvent to produce a filler-containing slurry solution, and a step (II) of adding the rubber latex solution to the filler-containing slurry solution to yield a filler-containing rubber latex solution, and stirring the yielded filler-containing rubber latex solution while heating the filler-containing rubber latex solution, thereby solidifying the filler-containing rubber latex solution, and a step (III) of stirring the resultant while adding an acid thereto, thereby solidifying the filler-containing rubber latex solution, wherein in the step (II), the circumferential speed of a stirring impeller which a mixing tank used at the time of the stirring has is less than 10 m/s, and a calorie of 25 to 250 J both inclusive per unit period and unit mass is given to the filler-containing rubber latex solution by the heating.

The wet rubber masterbatch producing process of the present invention has, as solidifying steps thereof, two steps, specifically, the step (II), which is the first solidifying step, and the step (III), which is the second solidifying step. In the step (II), which is the first solidifying step, in order to lower mechanical energy given to the filler-containing rubber latex solution appropriately, the circumferential speed of the stirring impeller, which the mixing tank used at the time of the stirring has, is set to less than 10 m/s. Instead of lowering the mechanical energy appropriately, thermal energy given to the filler-containing rubber latex solution is optimized. For the optimization, the calorie per unit period and unit mass that is given by the heating, is set into the range of 25 to 250 J both inclusive. In this way, the rubber latex can be solidified in the step (II) while the dispersibility of the filler is heightened. At the stage when the filler-containing rubber latex solution is solidified into some degree in the step (II), the somewhat-solidified product is further stirred in the step (III) while an acid is added thereto. In this way, the filler-containing rubber latex solution is solidified. This process makes it possible to improve the dispersibility of the carbon black dramatically in the finally obtained rubber solidified product.

In the present invention, the "calorie per unit period and unit mass that is given by heating" is calculated out in accordance with the following: ""temperature [K] at the end of the stirring"–"temperature [K] at the start of the stirring""×"specific heat capacity [J/kg K]"/"stirring period [sec]".

In this producing process, it is preferred that the period for the stirring in the step (II) is 1.5 times or more that in the step (III). This producing process makes it possible to improve the dispersibility of the carbon black further in the rubber solidified product since the rate of the solidification in the filler-containing rubber latex solution by the acid is made appropriate. The upper limit of the stirring period in the step (II) to the stirring period in the step (III) is not particularly limited, and is preferably 10 times or less, considering productivity.

In the producing process, it is preferred that the step (I) is a step (I-(a)) in which when the filler is dispersed into the dispersing solvent, at least one portion of the rubber latex solution is added to the dispersing solvent, thereby producing a slurry solution which contains the filler to which rubber latex particles adhere, and the step (II) is a step (II-(a)) of adding the rest of the rubber latex solution to the slurry solution, which contains the filler to which the rubber latex particles adhere, to yield the filler-containing rubber latex solution in which the rubber latex particles adhere to the filler, and stirring the yielded rubber latex solution while heating the rubber latex solution, thereby solidifying the rubber latex solution.

According to this producing process, when the filler is dispersed into the dispersing solvent, the rubber latex solution is at least partially added thereto, thereby producing the slurry solution, which contains the filler to which the rubber latex particles adhere (step (I)-(a)). This manner makes it possible to produce a very thin latex phase onto a portion or the whole of the surface of the filler to prevent re-aggregation of the filler when this slurry solution is mixed with the rest of the rubber latex solution in the step (II)-(a)). As a result, a wet rubber masterbatch can be produced in which the filler is evenly dispersed and this filler is excellent in dispersion stability even when time elapses. In this wet masterbatch, the filler is evenly dispersed, and further the dispersing agent is also restrained from aggregating even when time elapses. Thus, a vulcanized rubber obtained using, as a raw material, a rubber composition containing this masterbatch is remarkably improved in exothermic property and fatigue resistance.

In the producing process, the filler is better in dispersibility in the slurry solution and the re-aggregation of the filler can be more greatly prevented than in the case of producing a slurry solution merely by dispersing a filler into a dispersing solvent. Thus, the producing process also produces an advantageous effect that the slurry solution is also excellent in storage stability.

Furthermore, the present invention relates to a wet rubber masterbatch produced by the producing process described in any one of the above-mentioned paragraphs concerned, and a rubber composition including this wet rubber masterbatch. This wet rubber masterbatch is excellent in carbon black dispersibility therein. Consequently, a vulcanized rubber and a pneumatic tire of the rubber composition containing the wet rubber masterbatch are improved in exothermic property and fatigue resistance.

Mode for Carrying Out the Invention

The present invention relates to a process for producing a wet rubber masterbatch obtainable using at least a filler, a dispersing solvent and a rubber latex solution as raw materials.

In the present invention, the filler denotes an inorganic filler used usually in the rubber industry, such as carbon black, silica, clay, talc, calcium carbonate, magnesium carbonate, or aluminum hydroxide. Out of these inorganic fillers, carbon black is in particular preferably usable in the invention.

The species of the carbon black may be a carbon black species used in an ordinary rubber industry, such as SAF, ISAF, HAF, FEF, or GPF, and may be further an electro-conductive carbon black species, such as acetylene black or Ketchen black. The carbon black species may be granulated carbon black, which is granulated in an ordinary rubber industry, considering the handleability thereof, or may be non-granulated carbon black.

The dispersing solvent is in particular preferably water. The solvent may be, for example, water containing an organic solvent.

As the rubber latex solution, a natural rubber latex solution and a synthetic rubber latex solution are usable.

The natural rubber latex solution is a natural product obtained by metabolic effect of a plant. Particularly preferred is a natural-rubber/water system latex solution in which a dispersing solvent is water. About the natural rubber latex solution, concentrated latex, fresh latex named field latex, and other latexes are usable without being distinguished from each other. The synthetic rubber latex solution is, for example, a latex solution of styrene-butadiene rubber, butadiene rubber, nitrile rubber or chloroprene rubber produced by emulsion polymerization.

Hereinafter, a description will be made about the process according to the present invention for producing a wet rubber masterbatch. This producing process includes a step (I) of dispersing the filler into the dispersing solvent to produce a filler-containing slurry solution, and a step (II) of adding the rubber latex solution to the filler-containing slurry solution to yield a filler-containing rubber latex solution, and stirring the yielded filler-containing rubber latex solution while heating this rubber latex solution, thereby solidifying the rubber latex solution, and a step (III) of stirring the resultant while adding an acid thereto, thereby solidifying the filler-containing rubber latex solution. The present invention is characterized by having, as solidifying steps, two steps, specifically, the step (II), which is the first solidifying step, and the step (III), which is the second solidifying step.

In the present embodiment, a description will be made, particularly, about an example using carbon black as the filler, and a natural rubber latex solution as the rubber latex solution. In this case, a wet rubber masterbatch can be produced in which the dispersion degree of the carbon black is very high and from which a vulcanized rubber further improved in exothermic property and fatigue resistance performance is yielded.

(1) Step (I)

In the step (I), the carbon black is dispersed into the dispersing solvent to produce a carbon black-containing slurry solution. In order to improve the carbon black further in dispersibility, it is preferred in the present invention to adopt, as the step (I), a step (I-(a)) in which when the carbon black is dispersed into the dispersing solvent, at least one portion of the natural rubber latex solution is added to the dispersing solvent, thereby producing a slurry solution which contains the carbon black to which natural rubber latex particles adhere. In the step (I-(a)), it is allowable to mix the natural rubber latex solution beforehand with the dispersing solvent, and then add the carbon black to the mixture to disperse the carbon black in the mixture. It is also allowable to add the carbon black to the dispersing solvent; and next add the natural rubber latex solution thereto at a predetermined adding-speed and simultaneously disperse the carbon black in the dispersing solvent. Alternatively, it is allowable to add the carbon black to the dispersing solvent; and next add thereto a predetermined volume of the natural rubber latex solution several times through operations separated from each other and simultaneously disperse the carbon black in the dispersing solvent. By dispersing the carbon black into the dispersing solvent in the presence of the natural rubber latex solution, the slurry solution can be produced, which contains the carbon black to which the natural rubber latex particles adhere. The addition amount of the natural rubber latex solution in the step (I-(a)) is, for example, from 0.5 to 50% by mass of the whole of the natural rubber latex solution to be used (the whole of fractions of this latex solution that are to be added in the step (I-(a)) and in the step (II)).

In the step (I-(a)), the solid (rubber) content in the natural rubber latex solution to be added is preferably from 0.5 to 10%, more preferably from 1 to 6% by mass of the carbon black. The concentration of the solid (rubber) in the natural rubber latex solution to be added is preferably from 0.5 to 5% by mass, more preferably from 0.5 to 1.5% by mass. In these cases, a wet rubber masterbatch can be produced in which the dispersion degree of the carbon black is heightened while the natural rubber latex particles are surely caused to adhere to the carbon black.

In the step (I-(a)), the method for mixing the carbon black and the dispersing solvent with each other in the presence of the natural rubber latex solution is, for example, a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated to act a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product. An example thereof is a mixer, "High Shear Mixer", manufactured by a company Silverson.

In the present invention, at the time of mixing the carbon black with the dispersing solvent in the presence of the natural rubber latex solution, thereby producing the slurry solution, which contains the carbon black to which the natural rubber latex particles adhere, a surfactant may be added thereto in order to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the finally obtained vulcanized rubber is lowered in rubber physical properties. Thus, the blend amount of the surfactant is preferably 2 parts or less by mass, more preferably 1 part or less by mass for 100 parts by mass of the solid (rubber) content in the natural rubber latex solution. It is preferred not to use any surfactant substantially.

In the slurry solution produced in the step (I-(a)), the 90% volume particle diameter (μm) ("D90") of the carbon black, to which the natural rubber latex particles adhere, is preferably 31 μm or more, more preferably 35 μm or more. This case makes the carbon black excellent in dispersibility in the slurry solution and further makes it possible to prevent the carbon black from re-aggregating, so that the slurry solution is excellent in storage stability and further the finally obtained vulcanized rubber is also excellent in exothermic property, durability and rubber strength. In the present invention, the D90 of the carbon black, to which the natural rubber latex particles adhere, denotes a value obtained by measuring the whole including not only the carbon black but also the adhering natural rubber latex particles.

(2) Step (II)

In the step (II), the rubber latex solution is added to the carbon black-containing slurry solution to yield a carbon black-containing natural rubber latex solution, and stirring the yielded carbon black-containing natural rubber latex solution while heating this rubber latex solution, thereby solidifying the rubber latex solution. In the step (II), the circumferential speed of a stirring impeller which a mixing tank used at the time of the stirring has is set to less than 10 m/s, and a calorie of 25 to 250 J both inclusive per unit period and unit mass is given to the carbon black-containing slurry solution by the heating. If the circumferential speed of the stirring impeller which the mixing tank used at the time of the stirring has is 10 m/s or more, the carbon black may be deteriorated in dispersibility, and the finally obtained vulcanized rubber may be deteriorated in exothermic property and fatigue resistance.

If the calorie per unit period and unit mass, which is given to the carbon black-containing natural rubber latex solution by the heating, is set to less than 25 J, the rubber latex solution is not insufficiently solidified by the thermal energy so that in the subsequent step (III), the solidification of the carbon black-containing natural rubber latex solution is to be rapidly advanced by an acid. Consequently, the carbon black may be deteriorated in dispersibility, and the finally obtained vulcanized rubber may be deteriorated in exothermic property and fatigue resistance. If the calorie per unit period and unit mass, which is given to the carbon black-containing natural rubber latex solution by the heating, is more than 250 J, the given thermal energy is too large so that the solidification of the carbon black-containing natural rubber latex solution may be rapidly advanced. Thus, a tendency is generated that the carbon black is deteriorated in dispersibility.

In order to adjust the calorie per unit period and unit mass, which is given to the carbon black-containing slurry solution by the heating, into the range of 25 to 250 J both inclusive in the step (II), the heating temperature, and the stirring period while the system is heated are set, for example, into respective ranges preferably from 70 to 180° C. and from 5 to 60 minutes, more preferably from 80 to 160° C. and from 10 to 45 minutes.

In the producing process according to the present invention, the mixing tank usable in the step (II) may any known mixing machine as far as the circumferential speed thereof is less than 10 m/s. The mixing tank is preferably a mixing tank in which a blade is rotated in a cylindrical container. Examples thereof include machines "SUPER MIXER" manufactured by Kawata Mfg Co., Ltd., "SUPER MIXER" manufactured by Shinei-Kikai Co., Ltd., "UNIVERSAL MIXER" manufactured by Tsukishima Machine Sales Co., Ltd., and "HENSCHEL MIXER" manufactured by Nippon Coke & Engineering Co., Ltd.

Considering the drying period and labor in the next step (III), the solid (rubber) concentration in the rest of the natural rubber latex solution is preferably higher than that in the natural rubber latex solution added in the step (I). Specifically, the former solid (rubber) concentration is preferably from 10 to 60% by mass, more preferably from 20 to 30% by mass.

In order to improve the carbon black in dispersibility in the producing process according to the present invention, the step (II) is preferably a step (II-(a)) of adding the rest of the rubber latex solution to the slurry solution, which contains the filler to which the rubber latex particles adhere, to yield the filler-containing rubber latex solution in which the rubber latex particles adhere to the filler, and stirring the yielded rubber latex solution while heating this rubber latex solution, thereby solidifying the rubber latex solution.

(3) Step (III)

In the step (III), the resultant is stirred while adding an acid thereto, thereby solidifying the carbon black-containing rubber latex solution. The acid, which acts as a solidifier, may be, for example, formic acid or sulfuric acid, which is usually used to solidify a rubber latex solution.

In order to improve the carbon black further in dispersibility in the resultant wet rubber masterbatch, the stirring period in the step (II) is preferably 1.5 times or more, more preferably from 2 to 10 times both inclusive the stirring period in the step (III).

After the solidifying stage in the step (III), the solution containing the solidified product is dried to yield a wet rubber masterbatch. The method for drying the solution containing the solidified product may be a method using a drying machine that may be of various types, such as an oven, a vacuum drier, or an air drier.

The wet rubber masterbatch obtained after the step (III) contains the filler preferably in an amount of 40 to 80 parts by mass for 100 parts by mass of the rubber. In this case, the wet rubber masterbatch can be produced with an improvement in the dispersion degree of the filler therein, this improvement having a good balance with improvements in the exothermic property and the fatigue resistance of a vulcanized rubber obtained from the masterbatch.

In the wet natural rubber masterbatch obtained after the step (III), the contained carbon black is evenly dispersed, and the carbon black is excellent in dispersion stability even when times elapses.

One or more blending agents used ordinarily in the rubber industry are optionally incorporated into the wet rubber masterbatch obtained after the step (III) to make it possible to produce a rubber composition according to the present invention. Examples of these agents include sulfur-containing vulcanizers, vulcanization promoters, silica, silane coupling agents, zinc oxide, stearic acid, vulcanization promoting aids, vulcanization retardants, organic peroxides, antiaging agents, softeners such as waxes and oils, and working aids.

The species of sulfur in the sulfur-containing vulcanizers may be any ordinary sulfur species for rubbers. Examples thereof include powdery sulfur, precipitated sulfur, insoluble sulfur, and highly dispersible sulfur. The sulfur content in the rubber composition according to the present invention for tire rubbers is preferably from 0.3 to 6 parts by mass for 100 parts by mass of the rubber component. If the sulfur content is less than 0.3 part by mass, the vulcanized rubber is short in crosslinkage density to be lowered in rubber strength and others. If the content is more than 6 parts by mass, the rubber is deteriorated, particularly, in both of heat resistance and durability. In order to keep the rubber strength of the vulcanized rubber good certainly and improve the heat resistance and the durability further, the sulfur content is set into a range more preferably from 1.5 to 5.5 parts by mass, even more preferably from 2.0 to 4.5 parts by mass for 100 parts by mass of the rubber component.

The vulcanization promoter may be a vulcanization promoter usable ordinarily for vulcanizing rubbers. Examples thereof include sulfonamide type, thiuram type, thiazole type, thiourea type, guanidine type, and dithiocarbamic acid salt type vulcanization promoters. These may be used singly or in the form of an appropriate mixture. The content of the vulcanization promoter(s) is more preferably from 1 to 5 parts by mass, even more preferably from 1.5 to 4 parts by mass for 100 parts by mass of the rubber component.

The antiaging agent may be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture. The content of the antiaging agent(s) is more preferably from 0.5 to 6.0 parts by mass, even more preferably from 1.0 to 4.5 parts by mass for 100 parts by mass of the rubber component.

The rubber composition according to the present invention can be obtained by using a kneading machine used in an ordinary rubber industry, such as a Bunbury mixer, a kneader or a roll, to mix the wet rubber masterbatch and optional components with each other to be kneaded, examples of the optional components including an additional rubber, a sulfur-containing vulcanizer, a vulcanization promoter, silica, a silane coupling agent, zinc oxide, stearic acid, a vulcanization promoting aid, a vulcanization retardant, an organic peroxide, an antiaging agent, a softener such as a wax or an oil, and a working aid.

The method for blending the individual components with each other is not particularly limited. The method be any one of a method of kneading the components other than the vulcanization-related components, such as the sulfur-containing vulcanizer and the vulcanization promoter, beforehand to prepare a masterbatch, adding the remaining components thereto, and further kneading the entire components; a method of adding the individual components in an arbitrarily-selected order to a machine to be kneaded; a method of adding the entire components to a machine to be kneaded; and other methods.

As described above, in the wet rubber masterbatch according to the present invention, the contained filler is evenly dispersed, and the filler is excellent in dispersion stability over time. Thus, in a rubber composition produced using this masterbatch, the contained filler is also evenly dispersed, and the filler is excellent in dispersion stability over time. In particular, a pneumatic tire produced using this rubber composition, specifically, a pneumatic tire using the rubber composition according to the invention in its tread rubber, side rubber, ply or belt coating rubber, or bead filler rubber has a rubber region where the filler is satisfactorily dispersed, for example, so as to be decreased in rolling resistance and be excellent in exothermic property and fatigue resistance performance.

EXAMPLES

Hereinafter, this invention will be more specifically described through a description of working examples thereof. Raw materials and apparatuses used therein are as follows:

Used Materials:

a) Fillers:

Carbon black "N110": "SEAST 9" manufactured by Tokai Carbon Co., Ltd.,

Carbon black "N330": "SEAST 3" manufactured by Tokai Carbon Co., Ltd., and

Carbon black "N774": "SEAST S" manufactured by Tokai Carbon Co., Ltd.;

b) Dispersing solvent: Water;

c) Rubber latex solution: Natural rubber latex manufactured by a company Golden Hope, which was used as a rubber latex; concentration: a concentration adjusted by adding water to the natural rubber latex at room temperature to give a rubber component concentration of 25% by weight (DRC (dry rubber content)=31.2%); mass-average molecular weight Mw=232,000, manufactured by a company Golden Hope;

d) Solidifier: Formic acid (solution obtained by diluting a first-class 85% solution thereof into a 10% solution and adjusting the pH of the diluted solution to 1.2), manufactured by Nacalai Tesque, Inc.;

e) Zinc oxide: Zinc flower No. 1, manufactured by Mitsui Mining & Smelting Co., Ltd.;

f) Stearic acid: LUNAC S-20, manufactured by Kao Corp.;

g) Wax: OZOACE 0355, manufactured by Nippon Seiro Co., Ltd.;

h) Antiaging agents:

(A) N-phenyl-N'-(1,3-dimethylbutyl)-p-phenylenediamine "NOCRAC 6C", manufactured by Ouchi Shinko Chemical Industrial Co., Ltd., and (B) 2,2,4-Trimethyl-1,2-dihydroxyquinoline polymer "RD", manufactured by Ouchi Shinko Chemical Industrial Co., Ltd.;

i) Sulfur: Sulfur manufactured by Tsurumi Chemical Industry Co., Ltd.;

j) Vulcanization promoter: N-cyclohexyl-2-benzothiazol sulfonamide "SANCELER CM" (manufactured by Sanshin Chemical Industry Co., Ltd.); and k) Additional rubber: "BR150L", manufactured by Ube Industries, Ltd.

Evaluations:

Evaluations were made about a rubber obtained by using a predetermined mold to heat and vulcanize each rubber composition at 150° C. for 30 minutes.

Exothermic Property of Vulcanized Rubber:

According to JIS K6265, the exothermic property of each of produced vulcanized rubbers was evaluated through the loss tangent tan δ thereof. A rheospectrometer, E4000, manufactured by a company UBM was used to measure the loss tangent at 50 Hz and 80° C. under a condition of a dynamic strain of 2%. The measured value was converted to an index. In the evaluation, the value of Comparative Example 1 was regarded as 100, and Examples 1 to 5 and Comparative Examples 1 to 4 were each evaluated through an index relative thereto; the value of Comparative Example 5 was regarded as 100, and Example 6 was evaluated through an index relative thereto; and the value of Comparative Example 6 was regarded as 100, and Example 7 was evaluated through an index relative thereto. It was denoted that as the numerical value was smaller, the exothermic property was better.

Fatigue Resistance Performance of Vulcanized Rubber:

According to JIS K6260, the fatigue resistance performance of each of the produced vulcanized rubbers was evaluated. In the evaluation, the value of Comparative Example 1 was regarded as 100, and Examples 1 to 5 and Comparative Examples 1 to 4 were each evaluated through an index relative thereto; the value of Comparative Example 5 was regarded as 100, and Example 6 was evaluated through an index relative thereto; and the value of Comparative Example 6 was regarded as 100, and Example 7 is evaluated through an index relative thereto. It was denoted that as the numerical value is larger, the fatigue resistance performance was better.

Example 1

To the above-mentioned diluted latex solution in water that had a concentration adjusted to 0.5% by mass were added 50 parts by mass of carbon black. The carbon black was dispersed therein, using a stirring machine (FLASH-BLEND) manufactured by a company Silverson (FLASH-BLEND conditions: 3600 rpm for 30 minutes) to produce a carbon black-containing slurry solution in which natural rubber latex particles adhered onto the carbon black (step (I)).

Next, the rest of the natural rubber latex solution (adjusted into a solid (rubber) concentration of 25% by mass by adding water to the above-mentioned diluted latex solution) was added to the carbon black-containing slurry solution produced in the step (I), in which the natural rubber latex particles adhered onto the carbon black, so as to adjust the solid (rubber) amount in the rest of the latex solution, and the natural rubber latex solution used in the step (II) to 100 parts by mass. Next, a mixing machine (SUPER MIXER SM-20) manufactured by Kawata Mfg Co., Ltd. used to stir the resultant carbon black-containing natural rubber latex solution in which the natural rubber latex particles adhered onto the carbon black while heating this rubber latex solution, thereby solidifying the rubber latex solution (step (II)).

Thereafter, while the resultant was stirred while adding a 10%-by-mass formic acid solution in water as a solidifier thereto to turn the pH thereof down to 4, thereby solidifying the carbon black-containing natural rubber latex solution, in which the natural rubber latex particles adhered onto the carbon black (step (III)). A screw press V-02 model manufactured by Suehiro EPM Corp. was used to dry the solidified product into a water content of 1.5% or less. In this way, a natural wet rubber masterbatch was produced.

Various additives described in Table 1 were blended into the resultant natural wet rubber masterbatch to prepare a rubber composition. The physical properties of a vulcanized rubber thereof were measured. The results are shown in Table 1.

Comparative Examples 1 to 6, and Examples 2 to 11

In each of the examples, a wet rubber masterbatch, a rubber composition and a vulcanized rubber were each produced in the same way as in Example 1 except that one or more of the following were changed as described in Table 1 or 2: the blend of the various components; whether or not heating was done in the step (II); whether or not an acid was added in the step (III); the circumferential speed of the stirring impellers in the step (II); the calorie in the step (II); the "stirring period in the step (II)"/"stirring period in the step (III)" ratio. The physical properties of the vulcanized rubbers are shown in Tables 1 and 2.

TABLE 1

| | | | Comparative Example 1 | Comparative Example 2 | Comparative Example 3 | Comparative Example 4 | Example 1 | Example 2 | Example 3 | Example 4 | Example 5 | Example 6 | Example 7 | Example 8 | Example 9 |
|---|---|---|---|---|---|---|---|---|---|---|---|---|---|---|---|
| \multicolumn{16}{c}{Blended components:} |
| Wet rubber masterbatch blend components | Carbon black | N110 | — | — | — | — | — | — | — | — | — | — | — | — | — |
| | | N330 | 50 | 50 | 50 | 50 | 50 | 50 | 50 | 50 | 50 | 50 | 50 | 50 | 50 |
| | | N774 | — | — | — | — | — | — | — | — | — | — | — | — | — |
| | Natural rubber (solid content) | | 100 | 100 | 100 | 100 | 100 | 100 | 100 | 100 | 100 | 100 | 100 | 100 | 100 |
| Blend components at rubber composition producing time | Additional rubber | | — | — | — | — | — | — | — | — | — | — | — | — | — |
| | Zinc flower | | 3 | 3 | 3 | 3 | 3 | 3 | 3 | 3 | 3 | 3 | 3 | 3 | 3 |
| | Stearic acid | | 2 | 2 | 2 | 2 | 2 | 2 | 2 | 2 | 2 | 2 | 2 | 2 | 2 |
| | Wax | | 1 | 1 | 1 | 1 | 1 | 1 | 1 | 1 | 1 | 1 | 1 | 1 | 1 |
| | Antiaging agents | (A) | 2 | 2 | 2 | 2 | 2 | 2 | 2 | 2 | 2 | 2 | 2 | 2 | 2 |
| | | (B) | 1 | 1 | 1 | 1 | 1 | 1 | 1 | 1 | 1 | 1 | 1 | 1 | 1 |
| | Sulfur | | 2 | 2 | 2 | 2 | 2 | 2 | 2 | 2 | 2 | 2 | 2 | 2 | 2 |
| | Vulcanization promoter | | 1 | 1 | 1 | 1 | 1 | 1 | 1 | 1 | 1 | 1 | 1 | 1 | 1 |
| \multicolumn{16}{c}{Step (II) and step (III) conditions:} |
| Heating in step (II) | | | Done | Not done | Done | Done | Done | Done | Done | Done | Done | Done | Done | Done | Done |
| Stirring period (min.) while heating in step (II) | | | 15 | 15 | 15 | 15 | 30 | 15 | 10 | 15 | 15 | 15 | 45 | 30 | 8 |
| Heating temperature (° C.) in step (II) | | | 190 | 60 | 120 | 110 | 100 | 125 | 150 | 105 | 150 | 125 | 80 | 100 | 125 |
| Addition of acid in step (III) | | | Done | Done | Not done | Done | Done | Done | Done | Done | Done | Done | Done | Done | Done |
| Circumferential speed (m/s) of impellers in step (II) | | | 5 | 5 | 5 | 30 | 5 | 5 | 5 | 5 | 5 | 8 | 5 | 5 | 5 |
| Calorie in step (II) | | | 294 | 12 | 102 | 102 | 51 | 102 | 153 | 63 | 153 | 102 | 29 | 51 | 102 |
| Stirring period (min.) in step (III) | | | 5 | 5 | 5 | 5 | 10 | 5 | 3 | 5 | 5 | 5 | 5 | 5 | 5 |
| Stirring period in step (II)/ stirring period in step (III) ratio | | | 3 | 3 | 3 | 3 | 3 | 3 | 3 | 3 | 3 | 3 | 9 | 6 | 1.6 |
| \multicolumn{16}{c}{Vulcanized rubber physical properties:} |
| Exothermic property (INDEX) | | | 100 | 104 | 103 | 98 | 92 | 90 | 94 | 93 | 94 | 90 | 93 | 91 | 93 |
| Fatigue resistance (INDEX) | | | 100 | 95 | 98 | 90 | 110 | 110 | 106 | 107 | 105 | 108 | 115 | 112 | 111 |

TABLE 2

| | | | Comparative Example 5 | Example 10 | Comparative Example 6 | Example 11 |
|---|---|---|---|---|---|---|
| \multicolumn{7}{c}{Blended components:} |
| Wet rubber masterbatch blend components | Carbon black | N110 | 45 | 45 | — | — |
| | | N330 | — | — | — | — |
| | | N774 | — | — | 70 | 70 |
| | Natural rubber (solid content) | | 80 | 80 | 100 | 100 |
| Blend components at rubber composition producing time | Additional rubber | | 20 | 20 | — | — |
| | Zinc flower | | 3 | 3 | 3 | 3 |
| | Stearic acid | | 2 | 2 | 2 | 2 |
| | Wax | | 1 | 1 | 1 | 1 |
| | Antiaging agents | (A) | 2 | 2 | 2 | 2 |
| | | (B) | 1 | 1 | 1 | 1 |
| | Sulfur | | 2 | 2 | 2 | 2 |
| | Vulcanization promoter | | 1 | 1 | 1 | 1 |
| \multicolumn{7}{c}{Step (II) and step (III) conditions:} |
| Heating in step (II) | | | Done | Done | Done | Done |
| Stirring period (min.) while heating in step (II) | | | 15 | 15 | 15 | 10 |

TABLE 2-continued

|  | Comparative Example 5 | Example 10 | Comparative Example 6 | Example 11 |
| --- | --- | --- | --- | --- |
| Heating temperature (° C.) in step (II) | 190 | 105 | 190 | 150 |
| Addition of acid in step (III) | Done | Done | Done | Done |
| Circumferential speed (m/s) of impellers in step (II) | 8 | 8 | 5 | 5 |
| Calorie in step (II) | 294 | 63 | 294 | 153 |
| Stirring period (min.) in step (III) | 5 | 5 | 5 | 5 |
| Stirring period in step (II) | 3 | 3 | 3 | 2 |
| Vulcanized rubber physical properties: | | | | |
| Exothermic property (INDEX) | 100 | 95 | 100 | 89 |
| Fatigue resistance (INDEX) | 100 | 106 | 100 | 112 |

From the results in Tables 1 and 2, it is understood that the vulcanized rubber obtained using the wet rubber masterbatch according to each of Examples 1 to 11 is excellent in exothermic property and fatigue resistance.

The invention claimed is:

1. A process for producing a wet rubber masterbatch comprising at least a filler, a dispersing solvent and a rubber latex solution as raw materials, wherein the process comprises:
   a step (I) of dispersing the filler into the dispersing solvent to produce a filler-containing slurry solution,
   a step (II) of adding the rubber latex solution to the filler-containing slurry solution to produce a filler-containing rubber latex solution, and stirring the filler-containing rubber latex solution while heating the filler-containing rubber latex solution, thereby solidifying the filler-containing rubber latex solution, and then
   a step (III) of stirring the filler-containing rubber latex solution while adding an acid thereto, thereby further solidifying the filler-containing rubber latex solution,
   wherein in the step (II), the circumferential speed of a stirring impeller, which a mixing tank used at the time of the stirring, is less than 10 m/s, and a calorie per unit period and unit mass that is given by the heating, is 25 to 250 J both inclusive.

2. The process for producing a wet rubber masterbatch according to claim 1, wherein the period for the stirring in the step (II) is 1.5 times or more that in the step (III).

3. The process for producing a wet rubber masterbatch according to claim 1, wherein the heat is at a temperature of 70 to 180° C.

4. The process for producing a wet rubber masterbatch according to claim 1, wherein the heat is at a temperature of 80 to 160° C.

5. The process for producing a wet rubber masterbatch according to claim 1, wherein the length of time stirring in step (II) is 1.5 times to 10 times longer than the length of time stirring in step (III).

6. A process for producing a wet rubber masterbatch comprising at least a filler, a dispersing solvent and a rubber latex solution as raw materials, wherein the process comprises:
   a step (I-a) of dispersing the filler into the dispersing solvent while also adding at least one portion of the rubber latex solution to the dispersing solvent to produce a filler-containing slurry solution which contains the filler to which rubber latex particles adhere,
   a step (II-a) of adding the rest of the rubber latex solution to the filler-containing slurry solution to produce a filler-containing rubber latex solution, in which the rubber latex particles adhere to the filler, and stirring the filler-containing rubber latex solution while heating the filler-containing rubber latex solution, thereby solidifying the filler-containing rubber latex solution, and then
   a step (III-a) of stirring the filler-containing rubber latex solution while adding an acid thereto, thereby further solidifying the filler-containing rubber latex solution,
   wherein in the step (II), the circumferential speed of a stirring impeller, which a mixing tank used at the time of the stirring, is less than 10 m/s, and a calorie per unit period and unit mass that is given by the heating, is 25 to 250 J both inclusive.

7. The process for producing a wet rubber masterbatch according to claim 6, wherein the heat is at a temperature of 70 to 180° C.

8. The process for producing a wet rubber masterbatch according to claim 6, wherein the heat is at a temperature of 80 to 160° C.

9. The process for producing a wet rubber masterbatch according to claim 6, wherein the length of time stirring in step (II) is 1.5 times to 10 times longer than the length of time stirring in step (III).

* * * * *